3,321,743

COMPARISON CIRCUIT

Peter Nador, Eatontown, N.J., assignor to Northern Electric Company Limited, Montreal, Quebec, Canada Filed June 10, 1964, Ser. No. 374,104
4 Claims. (Cl. 340—146.2)

The present invention relates to a circuit for comparing two sets of electrical data.

In many electrical equipments, it is necessary to compare two sets of data in electrical form to determine if the two sets of data are identical. If the two sets of data are not identical, then an indication of lack of identity is required and it may also be necessary to know where the two sets of data differ.

An example illustrating one use of such equipment is in the testing of automatic telephone equipment and in particular the testing of the operation of relay circuits. The normal method for determining if a given telephone apparatus is functioning properly, is to compare its operation with a standard piece of apparatus having a known response. That is, a first set of signal relays are compared with a second set of watching relays and if the signal relays are always in the same state as the watching relays while the equipment is operated, then the first set of equipment is operating satisfactorily. Similarly electrical data may be presented to the comparison circuit by using the data to control the state of relays. Thus each energized relay represents one digit of a binary number and the de-energized position of the relay represents the other binary digit. Accordingly by adjusting the energization of the sets of relays in accordance with two sets of binary electrical data the sets of data may be compared for identity. Where a large number of relays are involved in such an apparatus, it is necessary to know when the two sets of relays are not identically operated, and also which of the signal relays are operating improperly, and whether these relays are energized or de-energized.

The present invention provides a new and improved apparatus for comparing electrical data and in particular the operation of relays or switches. There are many devices which give analogous operation to relay contacts, or switches such as for example electronic switches and the state of series of such devices may be compared using the apparatus of the present inevntion.

In accordance with one aspect of the present invention, there is provided an apparatus for determining if corresponding switches of first and second sets of switches are in the same state.

The apparatus of the present invention is simple and reliable and may be used advantageously to compare the operation of a set of signal relays with a corresponding set of watching relays, and to indicate lack of identity and where the two sets of relays differ.

Figures 1, 2:
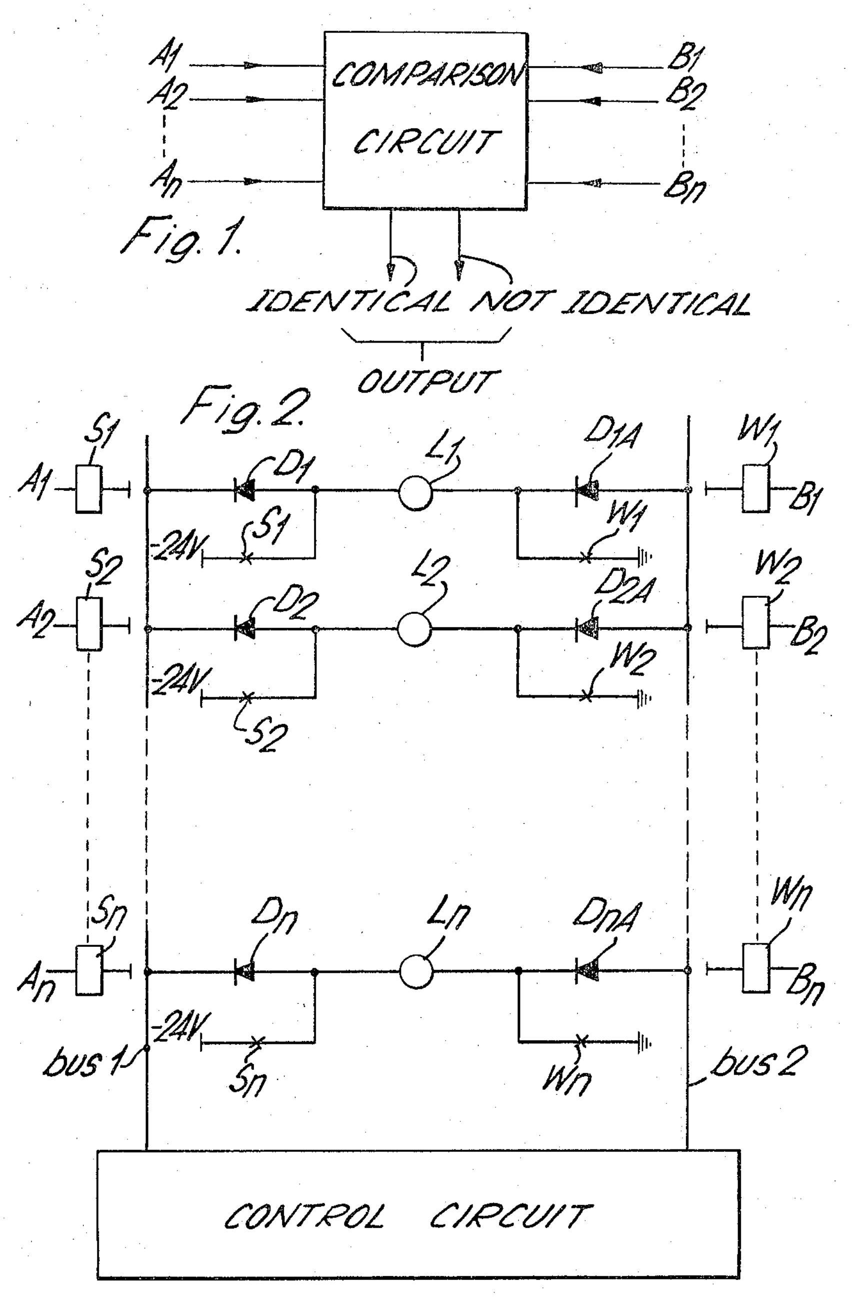
Figure 3:
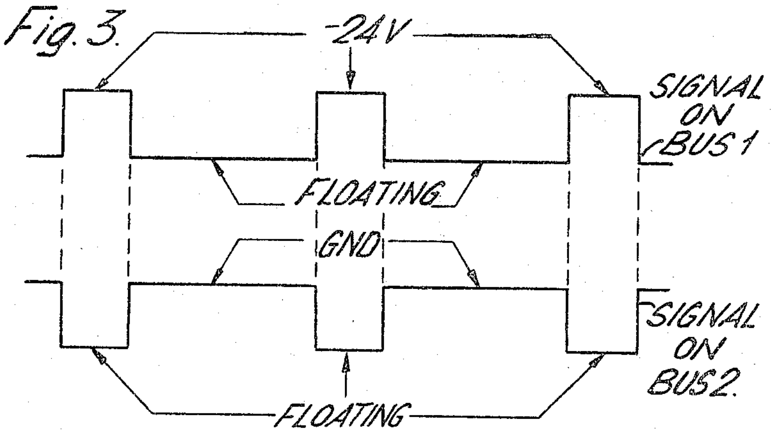

In drawings which illustrate embodiments of the invention,

FIGURE 1 is a block diagram illustrating the use of a comparison circuit,

FIGURE 2 is a partial schematic diagram showing the construction of a comparison circuit of the present invention, FIGURE 3 is a voltage-time diagram showing the signals applied to bus 1 and 2 respectively to determine the state of a malfunctioning signal relay, and FIGURES 4A, 4B, 4C and 4D are schematic diagrams of a form of comparator suitable for use with electronic circuits, showing the operation of the circuit.

With reference to the circuit of FIGURE 1, the function of this circuit is to compare a set of data presented to it in digital form on one set of leads $A_1$ and $A_n$ with another set of data presented in the same form on leads $B_1$ to $B_n$. The decision that the circuit will make is whether the two sets of data are identical or not. Provision is also made in the comparison circuit to indicate the lead where the two sets of data differ.

This function is widely needed in different types of digital data processing machines, such as computers, digital process controlling systems etc. The invention also finds application in automatic test sets for testing telephone relay systems where there are two complementary sets of relays. The first set of relays is the signal relays which indicate the result of a measurement. The second set of relays are the watching relays, which represent the specification for the same measurement. When used for automatic test sets, the comparison circuit functions to detect if the condition of the signal relays differs from the condition of the watching relays, to stop automatic testing if disagreement is detected, to identify by means of lamps the signal-watching relay pair which causes the difference in condition, and to indicate whether disagreement occurs because the watching relay is operated and the signal relay is released, or vice-versa. The circuit shown in FIGURE 2 will perform these functions with a minimum number of elements compared to all presently known circuits, which require appreciably more circuit elements to perform the equivalent functions.

A simplified schematic diagram of a test set using the invention is shown in FIGURE 2. A first set of signal relays $S_1$, $S_2$ . . . $S_n$ and a second set of watching relays $W_1$, $W_2$ . . . $W_n$ represent relays which are energized or de-energized in accordance with bits of data $A_1$, $A_2$ . . . $A_n$, $B_1$, $B_2$ . . . $B_n$. Each of the signal relays is represented in the electrical circuit diagram by a pair of contacts, one terminal of which is connected in each case to a source of minus 24 volts and the other terminal of each of the signal relays is connected respectively to the anode of the diodes $D_1$, $D_2$ . . . $D_n$. The cathodes of each of the diodes $D_1$, $D_2$ . . . $D_n$ are connected together to the bus bar 1. Similarly with the watching relays $W_1$, $W_2$ . . . $W_n$ one terminal of each of the pair of contacts is connected to ground and the other terminal is connected respectively to the cathode of diodes $D_1A$, $D_2A$ . . . $D_nA$, the anodes of diodes $D_1A$, $D_2A$, and $D_nA$ being all connected to a second bus bar 2. Bus bars 1 and 2 are connected to the control circuit which senses the presence of −24 volts on bus bar 2 and ground on bus bar 1. It can be seen that:

(a) If any of the relays $S_1$ . . . $S_n$ is released while its corresponding relay $W_1$ . . . $W_n$ is operated, bus 1 will be on ground potential.

(b) If any of the relays $S_1$ . . . $S_n$ is operated while its corresponding relay $W_1$ . . . $W_n$ is released, bus 2 will be on −24 v. potential.

(c) In any other case, bus 1 is either floating or on −24 v. potential, and bus 2 is either floating or on ground potential.

The associated control circuit functions in the following manner:

*Step 1.*—Test if bus 1 is on ground potential.

*Step 1A.*—If the answer is yes, register that there is a difference in the two sets of data and proceed with Step 3.

*Step 1B.*—If no ground is detected on bus 1 proceed with Step 2.

*Step 2.*—Test if bus 2 is on −24 v. potential.

*Step 2A.*—Same as Step 1A.

*Step 2B.*—If no −24 v. potential is present, the comparison is satisfactory and registered as such.

*Step 3.*—If a difference in the two sets of data is detected, the control circuit will connect an interrupted −24 v. signal to bus 1 and an interrupted ground signal to bus 2. These two signals are of different duration and are out of phase (see FIGURE 3). This will cause all lamps where the S-relay is released while the W-relay is operated, to flash with short periods ON and long periods OFF. Lamps corresponding to operated S-relay while W-relay is released, flash with short period OFF and long periods ON.

In general it is not necessary to use relays or to use the same potential values as described in the preceding section.

In test sets up to this time, the circuit described in U.S. Patent 2,328,750, FIGURES 2 and 8, has been used and as it can be seen, the number of contacts per relay is much greater than 1.

The circuit of the present invention is capable of doing comparison and to indicate the place of deviation in detail and also indicate the fact whether the comparison is satisfactory or not. The advantage of the circuit is that is uses only one "contact" per lead in the circuit just described, to perform all these functions.

In electronic circuits, it is possible to use the activating leads A and B directly, not requiring any additional elements. If conditions will not permit this arrangement, a single amplifier will suffice for each lead so that the circuit is operational. Thus, speed and economy is improved.

Figures 4A, 4B, 4C, 4D:
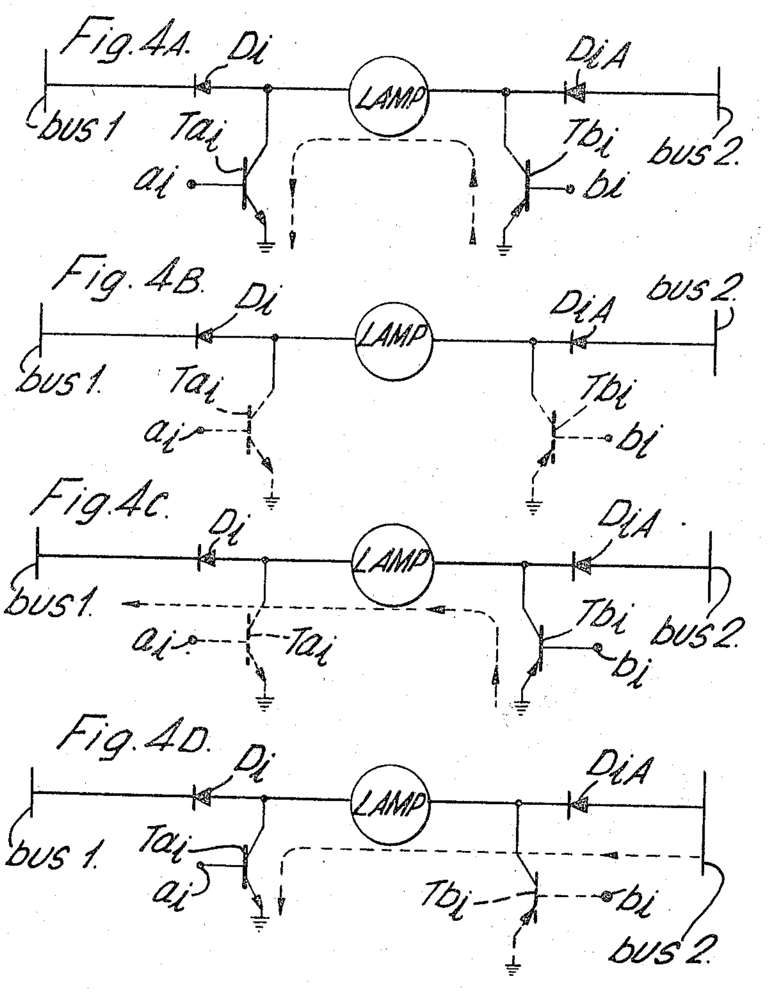

FIGURES 4A, 4B, 4C and 4D illustrate in schematic form an embodiment of the invention suitable for use with electronic circuits, wherein the signal available on the leads of sets *a* may be, for example ground for the binary digit 1 and —4.5 volts for the binary digit 0, and on set *b* the complementary voltage may be, for example, —4.5 volts for binary 1 and is ground for a binary 0. In each of FIGURES 4A, 4B, 4C, and 4D, a single pair of connections from the *a* and the *b* series is illustrated, on which comparisons are being made, these being shown as the *i*th pair. If $a_i=1$ and $b_i=1$, the condition illustrated in FIGURE 4A, then bus 1 and bus 2 are floating in the sense that their potential can be changed by conditions on other pairs and the diodes D*i* and D*i*A will not permit the voltages to appear on bus 1 or bus 2. Similarly if the inputs at $a_i$ and $b_i$ are zero, as illustrated in FIGURE 4B, then the transistors T$a_i$ and T$b_i$ will be both cut off and no current will flow through the lamp or through the diodes D*i* and D*i*A. Accordingly busses 1 and 2 will be floating so that the potential along these busses may be changed by other pairs of inputs.

FIGURE 4C illustrates one condition when the two sets of input data are not identical, that is when transistor T$a_i$ is cut off and transistor T$b_i$ is conducting. In this condition bus 1 will be connected to ground by the diode $D_i$ and bus 2 will be floating. In FIGURE 4D the opposite condition is illustrated where the transistor T$a_i$ is conducting and transistor T$b_i$ is cut off. In this case diode D*i*A will conduct so that bus 2 will be at —4.5 volts and bus 1 will be floating.

By applying test signals to bus 1 and bus 2 similar in form to the signals illustrated in FIGURE 3; the signal applied to bus 1 having a magnitude of —4.5 volts when connected and the signal applied to bus 2 being ground when connected; the two busses being floating when signals are not connected, it is possible to determine which pair of input data are not identical and to determine whether the lack of identity is due to the presence of an input on terminal $a_i$ with no input on terminal $b_i$ or whether there is no input on terminal $a_i$ when terminal $b_i$ has an input.

The circuit of FIGURE 4 is considerably simplified over the possible circuits using prior knowledge. For example, using the techniques of the prior art it would be necessary to use a series of AND or OR gates which would use a considerably greater number of components than are used with the circuit of the present invention.

I claim:

1. Apparatus for determining if corresponding switches of first and second sets of switches are in the same state comprising:

means for connecting one terminal of each switch in said first set to a first source of voltage of predetermined polarity and value, first and second sets of diodes, each diode having a first and a second terminal, means for connecting the other terminal of each switch in said first set to the first terminal of a diode of said first set of diodes, the second terminal of each of said diodes of said first set being connected to a first bus, means for connecting one terminal of each switch in said second set of switches to a second source of voltage of predetermined polarity opposite to the polarity of said first source, means for connecting the other terminal of each switch in said second set to the second terminal of a diode of said second set of diodes, the first terminal of each of said diodes of said second set being connected to a second bus, a lamp connected directly between the first terminal of each diode of said first set and the second terminal of the corresponding diode of the second set, each of said diodes of said first set being poled to cause said second voltage to appear on said first bus when a switch of said second set is closed and the corresponding switch of said first set is opened, and each of said diodes of said second set being poled to cause said first voltage to appear on said second bus when a switch of said first set is closed and the corresponding switch of the second set is opened, and means for detecting the presence of said second voltage on said first bus and said first voltage on said second bus to indicate a difference in state of said first and second sets of switches.

2. Apparatus according to claim 1 wherein means are provided for applying interrupted voltage to said first and second buses whereby the place of difference between the first set and second set may be detected.

3. Apparatus for determining if corresponding contacts of first and second sets of paired relay contacts are in the same state comprising:

first and second sets of diodes, each diode having a first and a second terminal, means for connecting one terminal of each pair of contacts in said first set to a first source of voltage of predetermined polarity, means for connecting the other terminal of each pair of contacts in said first set to the first terminal of a diode of the first set of diodes, the second terminal of each of said diodes of said first set being connected to a first bus, means for connecting one terminal of each pair of contacts in said second set of relay contacts to a second source of voltage of predetermined polarity different from the polarity of said first source, means for connecting the other terminal of each pair of relay contacts in said second set to a second terminal of a diode of the second set of diodes, the first terminal of each of said diodes in said second set being connected to a second bus, an indicating lamp connected between the first terminal of each diode of said first set, and a second terminal of the corresponding diode of the second set, each of said diodes of said first set being poled to cause said second voltage to appear on said first bus when a pair of contacts of said second set is closed and the corresponding pair of contacts of said first set is opened, and each of said diodes of said second set being poled to cause said first voltage to appear on said second bus when a pair of contacts of said first set is closed and the corresponding pair of contacts of the second set is opened, and means for detecting the presence of said second predetermined voltage on said first bus and said first predetermined voltage on said second bus.

4. Apparatus for comparing first and second sets of binary electrical data wherein the first set of data is present as two different predetermined voltage levels on a first set of leads, one lead of said first set of leads being provided for each bit of data in said first set of data, and the second set of data is present as two voltage levels complementary to said voltage levels of said first set of data on a second set of leads, one lead of said second set of leads being provided for each bit of data in said second set of data, said apparatus comprising a first bus, a second bus, first and second sets of diodes, each diode having a first and a second terminal, a first terminal of each diode of said first set connected to said first bus, the second terminal connected to a lead of said first set, a second terminal of each diode of said second set connected to said second bus, and the first terminal connected to a lead of said second set, an indicating lamp connected directly between the second terminal of each diode of said first set of diodes and the first terminal of the corresponding diode of said second set of diodes, each of said diodes of said first set being poled to cause one of said voltage levels from said second set of leads to appear on said first bus when the data on a lead of said first set of leads is different from the data on the corresponding lead of the second set of leads, and each of said diodes of said second set is poled to cause a voltage level from said first set of leads to appear on said second bus when data on a lead of said first set differs from data on a lead of said second set, and means for detecting the presence of one of said voltage levels from said second set of leads on said first bus, and the presence of a voltage level from said first set of leads on said second bus.

References Cited by the Examiner

UNITED STATES PATENTS 2,979,695 4/1961 Tyrlick et al. ------- 340—149

MALCOLM A. MORRISON, *Primary Examiner.*

K. MILDE, *Assistant Examiner.*